United States Patent
Osawa (10) Patent No.: US 10,212,344 B2
(45) Date of Patent: Feb. 19, 2019

(54) IMAGE CAPTURING DEVICE AND CONTROL METHOD CAPABLE OF ADJUSTING EXPOSURE TIMING BASED ON DETECTED LIGHT QUANTITY CHANGE CHARACTERISTIC

(71) Applicant: CANON KABUSHIKI KAISHA, Tokyo (JP)

(72) Inventor: Toshifumi Osawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/605,731

(22) Filed: May 25, 2017

(65) Prior Publication Data

US 2017/0353660 A1 Dec. 7, 2017

(30) Foreign Application Priority Data

Jun. 1, 2016 (JP) ................................. 2016-110346

(51) Int. Cl.
*H04N 9/73* (2006.01)
*H04N 5/232* (2006.01)
*H04N 5/235* (2006.01)

(52) U.S. Cl.
CPC ....... *H04N 5/23245* (2013.01); *H04N 5/2352* (2013.01)

(58) Field of Classification Search
CPC .................................................... H04N 5/2357
USPC .................................. 348/226.1, 227.1, 228.1
See application file for complete search history.

(56) References Cited

U.S. PATENT DOCUMENTS

2017/0134634 A1* 5/2017 Jin ........................ H04N 5/2357
2017/0366731 A1* 12/2017 Onodera .............. H04N 5/2357

FOREIGN PATENT DOCUMENTS

JP 2006-222935 A 8/2006
JP 2015-210283 A 11/2015

* cited by examiner

*Primary Examiner* — Anthony J Daniels
(74) *Attorney, Agent, or Firm* — Canon U.S.A., Inc. IP Division (57) ABSTRACT

Included are a photometric unit configured to obtain respective photometric values of a plurality of photometry areas in an image capturing area, an operation unit configured to perform setting regarding continuous shooting and/or focus adjustment, a calculation unit configured to calculate a light quantity change characteristic of a photometric target based on the photometric values of the plurality of photometry areas, an adjustment unit configured to adjust exposure timing based on the light quantity change characteristic, and a control unit configured to change a method of calculating the light quantity change characteristic according to the setting regarding continuous shooting and/or focus adjustment, and to determine whether the exposure timing is adjusted based on the light quantity change characteristic.

16 Claims, 8 Drawing Sheets

| | FIRST FLICKERLESS IMAGE CAPTURING MODE | SECOND FLICKERLESS IMAGE CAPTURING MODE | THIRD FLICKERLESS IMAGE CAPTURING MODE |
|---|---|---|---|
| FLICKER DETECTION METHOD | OVERALL AVERAGE DETECTION | OVERALL AVERAGE DETECTION | PARTIAL DETECTION |
| TIMING ADJUSTMENT | NO TIMING ADJUSTMENT BASED ON FLICKER DETECTION RESULT IS PERFORMED IN FIRST FRAME OF CONTINUOUS SHOOTING<br><br>TIMING ADJUSTMENT BASED ON OVERALL AVERAGE DETECTION RESULT IS PERFORMED IN SECOND AND SUBSEQUENT FRAMES OF CONTINUOUS SHOOTING<br><br>NO TIMING ADJUSTMENT BASED ON FLICKER DETECTION RESULT IS PERFORMED IN FIRST FRAME RIGHT AFTER OBJECT DETECTION INFORMATION IS DETERMINED NOT TO HAVE CONTINUITY, EVEN IN SECOND OR SUBSEQUENT FRAME OF CONTINUOUS SHOOTING | TIMING ADJUSTMENT BASED ON OVERALL AVERAGE DETECTION RESULT IS ALWAYS PERFORMED | TIMING ADJUSTMENT BASED ON PARTIAL DETECTION RESULT IS ALWAYS PERFORMED |

FIG. 8

| SETTING ITEM | DRIVE SETTING | AF SETTING |
|---|---|---|
| SETTING CHOICES | (1) SINGLE IMAGE SHOOTING<br>(2) HIGH-SPEED CONTINUOUS SHOOTING<br>(3) LOW-SPEED CONTINUOUS SHOOTING<br>(4) SELF-TIMER | (1) PRIORITY TO DISTANCE MEASUREMENT<br>(2) PRIORITY TO TIMING |

FIG. 9A

TIME (sec.)

FIG. 9B

TIME (sec.)

FIG. 10

|  | FIRST FLICKERLESS IMAGE CAPTURING MODE | SECOND FLICKERLESS IMAGE CAPTURING MODE | THIRD FLICKERLESS IMAGE CAPTURING MODE |
|---|---|---|---|
| FLICKER DETECTION THRESHOLD | THRESHOLD "LARGE" ONLY LARGE AMPLITUDE IS DETECTED | THRESHOLD "LARGE" ONLY LARGE AMPLITUDE IS DETECTED | THRESHOLD "SMALL" AMPLITUDE INCLUDING SMALL AMPLITUDE IS DETECTED |
| TIMING ADJUSTMENT | NO TIMING ADJUSTMENT BASED ON FLICKER DETECTION RESULT IS PERFORMED IN FIRST FRAME OF CONTINUOUS SHOOTING<br><br>TIMING ADJUSTMENT BASED ON FLICKER DETECTION RESULT IS PERFORMED IN SECOND AND SUBSEQUENT FRAMES OF CONTINUOUS SHOOTING<br><br>NO TIMING ADJUSTMENT BASED ON FLICKER DETECTION RESULT IS PERFORMED IN FIRST FRAME RIGHT AFTER OBJECT DETECTION INFORMATION IS DETERMINED NOT TO HAVE CONTINUITY, EVEN IN SECOND OR SUBSEQUENT FRAME OF CONTINUOUS SHOOTING | TIMING ADJUSTMENT BASED ON FLICKER DETECTION RESULT IS ALWAYS PERFORMED | TIMING ADJUSTMENT BASED ON FLICKER DETECTION RESULT IS ALWAYS PERFORMED |

IMAGE CAPTURING DEVICE AND CONTROL METHOD CAPABLE OF ADJUSTING EXPOSURE TIMING BASED ON DETECTED LIGHT QUANTITY CHANGE CHARACTERISTIC

BACKGROUND OF THE INVENTION

Field of the Invention

The aspect of the embodiments relates to an image capturing device, and especially relates to a technology to calculate a light quantity change characteristic of light from a photometric target.

Description of the Related Art

In recent years, improvement of sensitivity of image capturing devices such as digital cameras and mobile phones has been in progress. Therefore, even under a relatively dark environment such as inside a room, acquisition of a bright image with suppressed blur becomes possible by image capture with a high shutter speed (a short exposure time).

Further, fluorescent lamps widespread as room light sources have flicker that is a phenomenon in which illumination light periodically flickers due to an influence of a commercial power supply frequency. If image capture with a high shutter speed is performed under the light source in which such flicker is caused (hereinafter, referred to as flicker light source), exposure nonuniformity and color nonuniformity may occur in one image, and variation in exposure and color temperature may occur among a plurality of sequentially captured images.

To respond to such situations, Japanese Patent Laid-Open No. 2006-222935 proposes a technology to detect a state of flicker of illumination light, and to adjust image capturing timing such that a center of an exposure time is approximately matched with timing when a light quantity of the illumination light indicates a relative maximum.

SUMMARY OF THE INVENTION

An image capturing device includes a photometric unit, an operation unit, a calculation unit, an adjustment unit, and a control unit. The photometric unit is configured to obtain respective photometric values of a plurality of photometry areas in an image capturing area. The operation unit is configured to perform setting regarding continuous shooting and/or focus adjustment. The calculation unit is configured to calculate a light quantity change characteristic of a photometric target based on the photometric values of the plurality of photometry areas. The adjustment unit is configured to adjust exposure timing based on the light quantity change characteristic. The control unit is configured to change a method of calculating the light quantity change characteristic according to the setting regarding continuous shooting and/or focus adjustment, and to determine whether the exposure timing is adjusted based on the light quantity change characteristic.

DESCRIPTION OF THE EMBODIMENTS

Hereinafter, favorable exemplary embodiments of the disclosure will be described in detail based on the drawings below.

First Exemplary Embodiment

Figure 1:
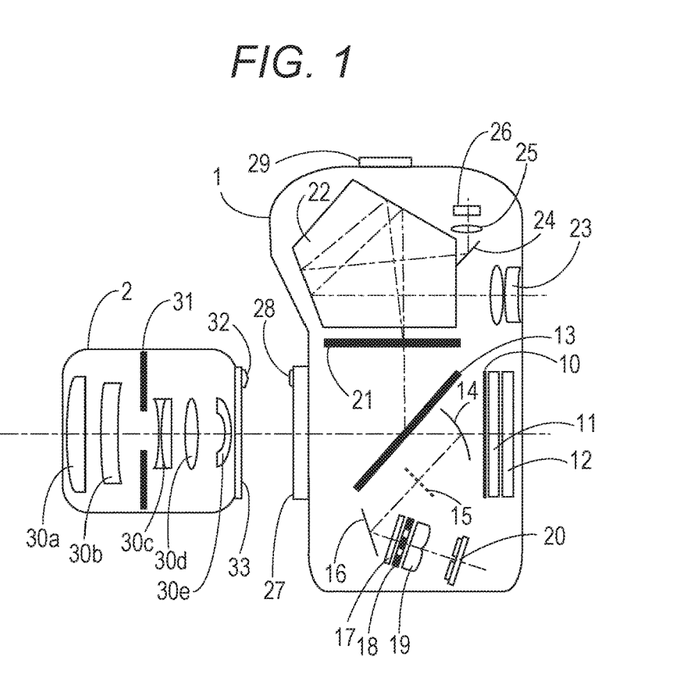
FIG. 1 is a schematic diagram of an image capturing system according to an exemplary embodiment of the disclosure.

FIG. 1 is a schematic diagram of an image capturing system according to an exemplary embodiment of the disclosure. The image capturing system of FIG. 1 includes a camera body 1 as an image capturing device and an interchangeable lens 2 as a detachable interchangeable lens of the camera body 1.

The camera body 1 includes a mechanical shutter 10, an optical low-pass filter 11, and an image capturing element 12 including an area accumulation-type photoelectric conversion element such as a CMOS or a CCD. When the mechanical shutter 10 is retracted from a light path, the image capturing element 12 is exposed.

The camera body 1 includes a semi-transmissive main mirror 13 and a first reflection mirror 14. Both the main mirror 13 and the first reflection mirror 14 leap up upward at the time of image capture and are retracted from the light path.

Figure 2:
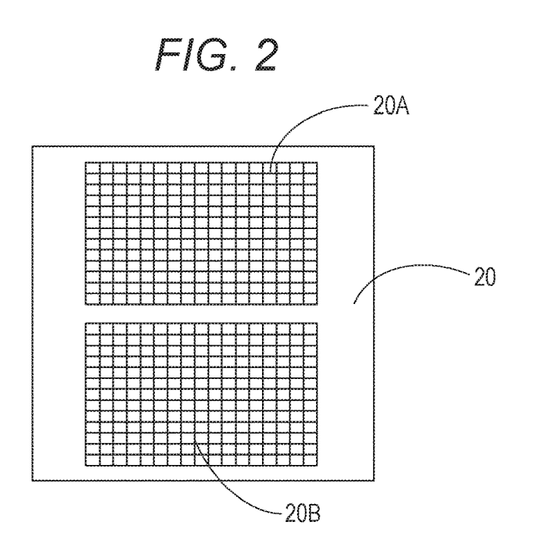
FIG. 2 is a diagram illustrating a configuration example of a focus detection sensor.

The camera body 1 includes a paraxial image forming plane 15 conjugated with an image capturing plane of the image capturing element 12 by the first reflection mirror 14, a second reflection mirror 16, an infrared ray cut filter 17, a diaphragm 18 including two apertures, a secondary image-forming lens 19, and a focus detection sensor (AF sensor) 20. The focus detection sensor 20 is formed of an area accumulation-type photoelectric conversion element such as a CMOS, for example. FIG. 2 is a diagram illustrating a configuration example of the focus detection sensor 20, and a light-receiving sensor unit divided into a large number of sections corresponding to the two apertures of the diaphragm 18 has a pair of areas 20A and 20B, as illustrated in FIG. 2. In addition to the light-receiving sensor units 20A and 20B, a signal accumulating unit, a signal processing peripheral circuit, and the like are mounted on the same chip as an integrated circuit. The configuration from the first reflection mirror 14 to the focus detection sensor 20 enables focus detection by a phase difference detection method in a plurality of positions in an image capturing area.

The camera body 1 includes a focusing plate 21 having diffusibility, a penta prism 22, an eyepiece lens 23, a third reflection mirror 24, a condensing lens 25, and a photometric sensor (AE sensor) 26 for obtaining information regarding luminance of an object. The focusing plate 21, the penta prism 22, and the eyepiece lens 23 configure a viewfinder optical system. A part of rays of light reflected by the main mirror 13 and diffused by the focusing plate 21, the part being outside an optical axis, enters the photometric sensor 26.

Figure 3A:
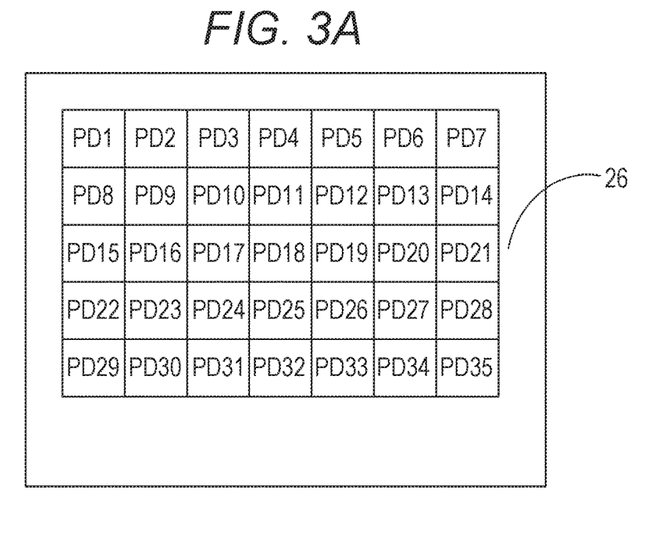
FIGS. 3A and 3B are diagrams illustrating a relationship between photometry areas of a photometric sensor and focus detection positions of the focus detection sensor.
Figure 3B:
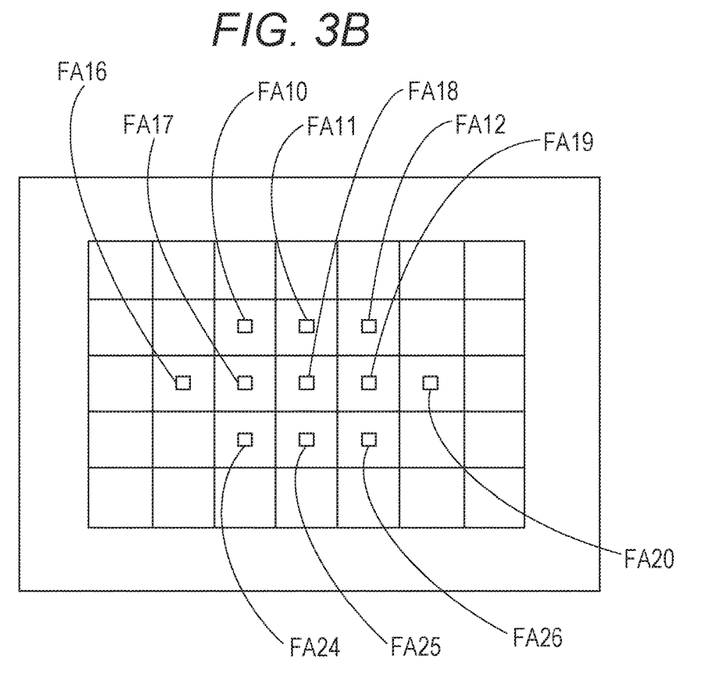

The photometric sensor 26 is formed of an area accumulation-type photoelectric conversion element such as a CMOS or the like. FIG. 3A is a diagram illustrating a configuration example of the photometric sensor 26. As illustrated in FIG. 3A, the photometric sensor 26 can output luminance information and color information of an object in every area (photometry area) that is one of a plurality of divided light-receiving areas. In the present example, the plurality of divided areas is 7 line×5 row 35 divided areas, and the 35 divided areas are called PD1 to PD35. Although not illustrated, the divided areas PD1 to PD35 are further divided into fine light-receiving portion pixels, and the pixels are provided with color filters in a fixed array. Object detection information can be obtained based on output information of the photometric sensor 26 having such a configuration. The object detection information is face detection information of a person based on outputs of the fine light-receiving portion pixels of the photometric sensor 26, or color information of a main object based on the color detection information of the photometric sensor 26. FIG. 3B is a diagram illustrating a relationship between the photometry areas of the photometric sensor 26 and focus detection positions by the focus detection sensor 20. The present example is an example in which focus detection positions in the image capturing area by the focus detection sensor 20 are 11 points from FA10 to FA26. The respective focus detection positions are matched with the photometry areas PD10 to PD26 by the photometric sensor 26.

The camera body 1 includes a mount portion 27 to which the interchangeable lens 2 is attached, a contact portion 28 for performing information communication with the interchangeable lens 2, and a connection portion 29 to which a flash is attached.

The interchangeable lens 2 includes optical lenses 30a to 30e that configure an image capture lens, a diaphragm 31, a contact portion 32 for performing information communication with the camera body 1, and a mount portion 33 for being attached to the camera body 1.

Figure 4:
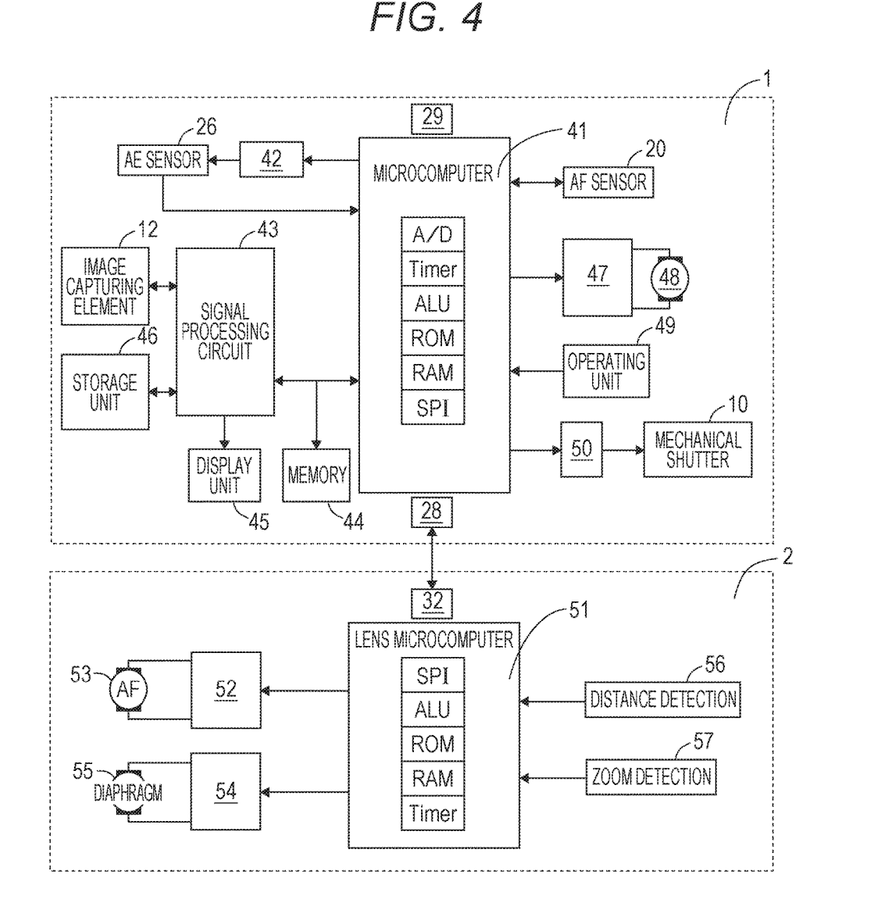
FIG. 4 is a block diagram of an image capturing system according to an exemplary embodiment of the disclosure.

FIG. 4 is a block diagram of the image capturing system illustrated in FIG. 1, and portions similar to those of FIG. 1 are denoted with the same reference numbers as those of FIG. 1.

In the camera body 1, a one-chip microcomputer (microcomputer) 41 has an ALU, a ROM, a RAM, an A/D converter, a timer, and a serial communication port (SPI) built in, and performs overall control of the camera image capturing system.

Output signals of the focus detection sensor 20 and the photometric sensor 26 are connected to A/D converter input terminals of the microcomputer 41. A timing generator 42 generates a timing signal for controlling accumulation and readout of the photometric sensor 26, and the like.

A signal processing circuit 43 controls the image capturing element 12 according to an instruction of the microcomputer 41 to perform signal processing while A/D converting and inputting an image capturing signal output by the image capturing element 12, and obtains an image signal. Further, the signal processing circuit 43 performs image processing such as compression in recording the obtained image signal. A memory 44 such as a DRAM is used as a work memory when the signal processing circuit 43 performs various types of signal processing, and is also used as a VRAM when an image is displayed on a display unit 45, described below. The display unit 45 is configured from a liquid crystal panel and the like, and displays various types of image capture information and captured images, and is controlled and lighted according to an instruction from the microcomputer 41. A storage unit 46 such as a flash memory or an optical disc is input a captured image signal from the signal processing circuit 43 and stores the image signal.

A first motor driver 47 is connected with an output terminal of the microcomputer 41 and is controlled by the microcomputer 41 to drive a first motor 48 for performing up and down of the main mirror 13 and the first reflection mirror 14 and charging the mechanical shutter 10. An operation unit 49 includes a release switch for instructing start of image capture and an operation button for setting various functions. As the function setting of the camera body 1 in the present exemplary embodiment, setting exemplarily illustrated in FIG. 8 can be set. As setting items, there are two types including setting regarding continuous shooting (drive setting) and setting regarding focus adjustment (AF setting). The drive setting is selectable from among four types including single image shooting (one-frame image capture), high-speed continuous shooting such as ten frames per second, low-speed continuous shooting such as three frames per second, and a self-timer that captures an image after the elapse of 10 seconds from when the release switch is turned ON. The AF setting is selectable from distance measurement priority, which gives priority to focus accuracy securement to an object even if time is required for focus adjustment and captures an image, and timing priority, which gives priority to making image capture timing early over the focus accuracy depending on a condition, by providing restrictions on time of focus adjustment.

The contact portion 28 is a portion coming in contact with the interchangeable lens 2 and to which an input/output signal of a serial communication port of the microcomputer 41 is connected. The connection portion 29 is a portion connected with a flash 3 and to which an input/output signal of a serial communication port of the microcomputer 41 is connected so that communication with the flash 3 becomes possible. A shutter drive unit 50 is connected to an output terminal of the microcomputer 41 and drives the mechanical shutter 10.

The interchangeable lens 2 includes a lens microcomputer 51 formed of a one-chip microcomputer in which an ALU, a ROM, a RAM, a timer, a serial communication port (SPI), and the like are built in.

A second motor driver 52 is connected to an output terminal of the lens microcomputer 51 and is controlled by the lens microcomputer 51 to drive a second motor 53 for performing the focus adjustment. A third motor driver 54 is connected to an output terminal of the lens microcomputer 51 and is controlled by the lens microcomputer 51 to drive a third motor 55 for controlling the diaphragm 31. A distance encoder 56 is used to obtain information regarding an extension amount of a focus lens, that is, object distance, and is connected to an input terminal of the lens microcomputer 51. A zoom encoder 57 is used to obtain focal distance information at the time of image capture in a case where the interchangeable lens 2 is a zoom lens, and is connected to an input terminal of the lens microcomputer 51. The contact portion 32 is a portion coming in contact with the camera body 1, and to which an input/output signal of a serial communication port of the lens microcomputer 51 is connected.

When the interchangeable lens 2 is mounted to the camera body 1, the contact portions 28 and 32 are connected with each other and the lens microcomputer 51 becomes able to perform data communication with the microcomputer 41 of the camera body 1. Optical information unique to the lenses for the focus detection and exposure calculation by the microcomputer 41 of the camera body 1 is output through the data communication from the lens microcomputer 51 to the microcomputer 41 of the camera body 1. Further, information regarding the object distance or focal distance information based on the distance encoder 56 or the zoom encoder 57 is output through the data communication from the lens microcomputer 51 to the microcomputer 41 of the camera body 1. Further, focus adjustment information and diaphragm information obtained as a result of focus detection and exposure calculation by the microcomputer 41 of the camera body 1 are output through the data communication from the microcomputer 41 of the camera body 1 to the lens microcomputer 51. Then, the lens microcomputer 51 controls the second motor driver 52 according to the focus adjustment information, and controls the third motor driver 54 according to the diaphragm information.

Figure 5:
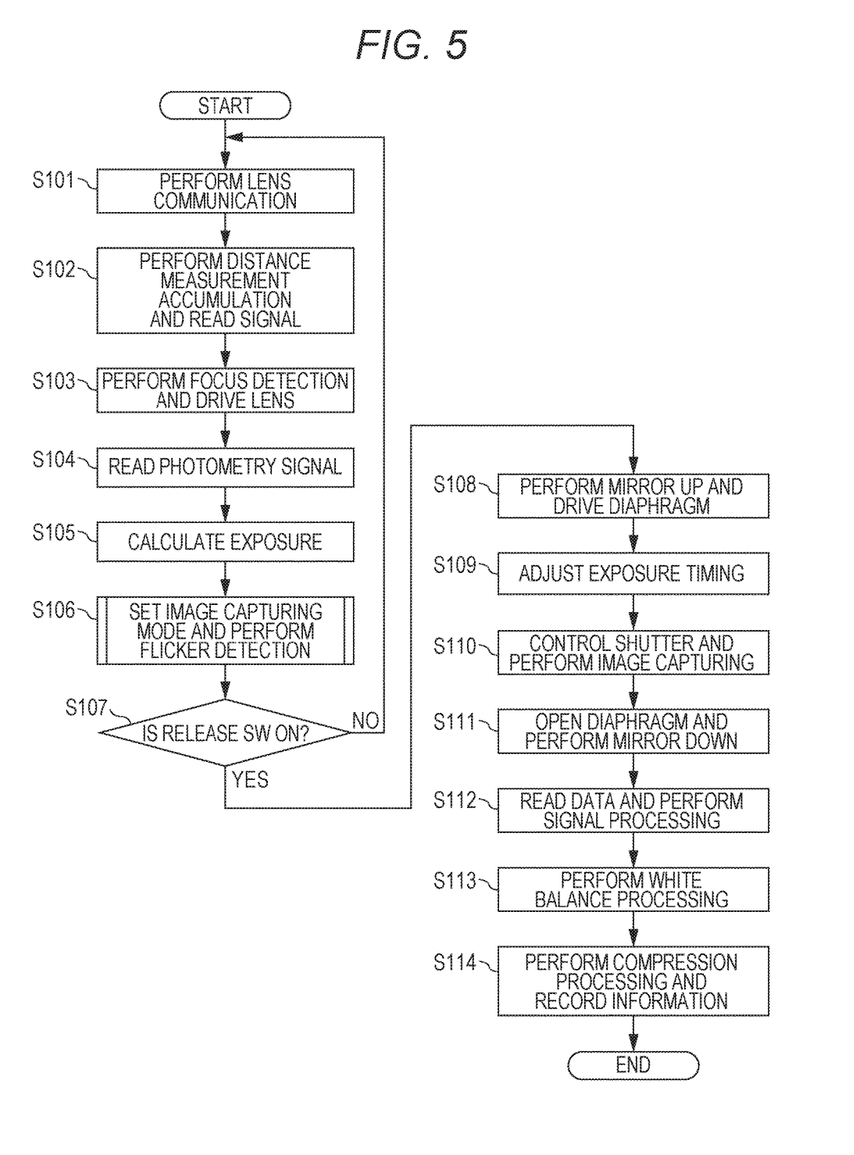
FIG. 5 is a diagram illustrating an operation regarding image capture of the image capturing system according to an exemplary embodiment of the disclosure.

Next, an operation regarding image capture of the image capturing system of the present exemplary embodiment will be described using FIG. 5. FIG. 5 is a diagram illustrating an operation regarding image capture of the image capturing system of the present exemplary embodiment. When a power switch (not illustrated) included in the camera body 1 is turned ON and the microcomputer 41 becomes operable, the operation illustrated in FIG. 5 is started.

In step S101, the microcomputer 41 performs communication with the lens microcomputer 51 and obtains various types of lens information for distance measurement and photometry.

In step S102, the microcomputer 41 outputs a control signal to the focus detection sensor 20. Then, when signal accumulation if the focus detection sensor 20 is terminated, the microcomputer 41 reads the signals accumulated in the focus detection sensor 20 and performs A/D conversion, and performs various types of data correction such as shading for read digital data.

In step S103, the microcomputer 41 calculates focus states of the focus detection positions in the image capturing area based on the lens information obtained in step S101 and the digital data obtained in the step S102, and determines an area to be focused in the image capturing area (in-focus target area). If there is an area designated in advance by an operation member (not illustrated) or the like included in the camera body 1, the designated area may be used as the in-focus target area may.

Then, the microcomputer 41 calculates a lens moving amount for obtaining in-focus according to the focus state in the determined in-focus target area, and outputs the calculated lens moving amount to the lens microcomputer 51. The lens microcomputer 51 outputs a signal to the second motor driver 52 to drive the second motor 53 to drive the focus lens based on the lens moving amount acquired from the microcomputer 41. Accordingly, the object in the determined in-focus target area becomes in an in-focus state. Here, the information of the distance encoder 56 is changed as the focus lens is driven, and thus the microcomputer 41 performs communication with the lens microcomputer 51, and updates the various types of lens information. Further, the microcomputer 41 reads the signals of the signal accumulation of the focus detection sensor 20 and calculates the focus states of the focus detection positions in the image capturing area again, after the object in the in-focus target area becomes in the in-focus state.

In step S104, the microcomputer 41 controls the timing generator 42 to perform predetermined accumulation control and signal readout control of the photometric sensor 26. Here, the microcomputer 41 performs control to obtain first photometric information and second photometric information, the first photometric information being used for object detection processing and for exposure calculation to determine exposure at the time of image capture, and the second photometric information being used for calculation of a light quantity change characteristic (light quantity change period and phase) of a photometric target.

To obtain the second photometric information, the microcomputer 41 repeatedly performs the accumulation control and the signal readout control a plurality of times at a substantially shorter interval than the supposed light quantity change period. The microcomputer 41 sequentially reads out the accumulated signals of the plurality of times from the photometric sensor 26, performs A/D conversion for the signals, and stores the signals in the RAM. Accumulation for obtaining the first photometric information and accumulation for obtaining the second photometric information can be independently performed, or photometric information obtained from the accumulation for obtaining the second photometric information can be added to obtain accumulation information for obtaining the first photometric information.

In step S105, the microcomputer 41 performs the object detection processing and exposure calculation processing based on the first photometric information stored in the RAM. The object detection processing is face detection of a person, color detection of an object, and the like, and these pieces of information can be fed back to focus the same object at the time of next focus detection in continuous image capturing.

The exposure calculation processing is to calculate photometric values of photometry areas divided into 35 areas from the first photometric information, and to calculate a weighting coefficient of each photometry area based on the object detection information and the information of the in-focus target area determined in step S103. Then, object luminance is calculated by a known method of weighting the photometric value of each photometry area and obtaining a weighted average of the weighted photometric values. When the object luminance is calculated, exposure conditions such as a shutter speed, a diaphragm value, and image capture sensitivity, in which appropriate image capture can be performed for the luminance, are determined.

In step S106, the microcomputer 41 sets an image capturing mode, and calculates the light quantity change characteristic of the photometric target. Hereinafter, calculation of the light quantity change characteristic of the photometric target is called flicker detection. Details of processing regarding the setting of the image capturing mode and the flicker detection executed in step S106 will be described below.

In step S107, the microcomputer 41 waits for ON of the release switch. The microcomputer 41 moves onto step S101 if the release switch is not turned ON, and moves onto step S108 if the release switch is turned ON.

In step S108, the microcomputer 41 outputs a control signal to the first motor driver 47 to drive the first motor 48 to leap up the main mirror 13 and the first reflection mirror 14. Then, the microcomputer 41 outputs diaphragm value information calculated in step S106 to the lens microcomputer 51. The lens microcomputer 51 outputs a signal to the third motor driver 54 to drive the third motor 55 to drive the diaphragm 31 according to the information.

In step S109, the microcomputer 41 performs exposure timing adjustment according to the set image capturing mode in a case where flicker is being detected by the flicker detection in step S106 (a light quantity of the photometric target is being changed in a predetermined period). Processing regarding the exposure timing adjustment will be described below.

In step S110, the microcomputer 41 outputs a signal to the shutter drive unit 50 to cause the mechanical shutter 10 to be in an open state. Accordingly, light transmitted to interchangeable lens 2 enters the image capturing element 12 (exposure state). The microcomputer 41 outputs an instruction to the signal processing circuit so that the image capturing element 12 is set to an accumulation time according to the shutter speed calculated in step S105 and a reading gain according to predetermined image capturing sensitivity and the signal accumulation is performed.

When the accumulation time according to the shutter speed calculated in step S105 has passed, the microcomputer 41 outputs a signal to the shutter drive unit 50 to cause the mechanical shutter 10 to be in a light-shielding state. Accordingly, the light transmitted the interchangeable lens 2 is shielded from the image capturing element 12.

In step S111, the microcomputer 41 outputs information to the lens microcomputer 51 to open the diaphragm 31. The lens microcomputer 51 outputs a signal to the third motor driver 54 to drive the third motor 55 to drive the diaphragm 31 according to the information from the microcomputer 41. Further, the microcomputer 41 outputs a control signal to the first motor driver 47 to drive the first motor 48 to make the main mirror 13 and the first reflection mirror 14 down.

In step S112, the microcomputer 41 reads while A/D converting captured image information from the image capturing element 12, and outputs an instruction to the signal processing circuit 43 to perform correction processing and interpolation processing.

In step S113, the microcomputer 41 outputs an instruction to the signal processing circuit 43 to perform white balance adjustment for the captured image information. To be specific, an image based on the captured image information is divided into a plurality of areas, and a white area of the object is extracted according to a color difference signal of each area. Then, gain correction of a red channel and a blue channel of the entire image is performed based on a signal of the extracted area, and the white balance adjustment is performed.

In step S114, the microcomputer 41 outputs an instruction to the signal processing circuit 43 to compress and convert the captured image information for which the white balance adjustment has been performed into a recording file format, and to store the information in the storage unit 46. The above is the series of operations regarding the image capture.

Figure 6:
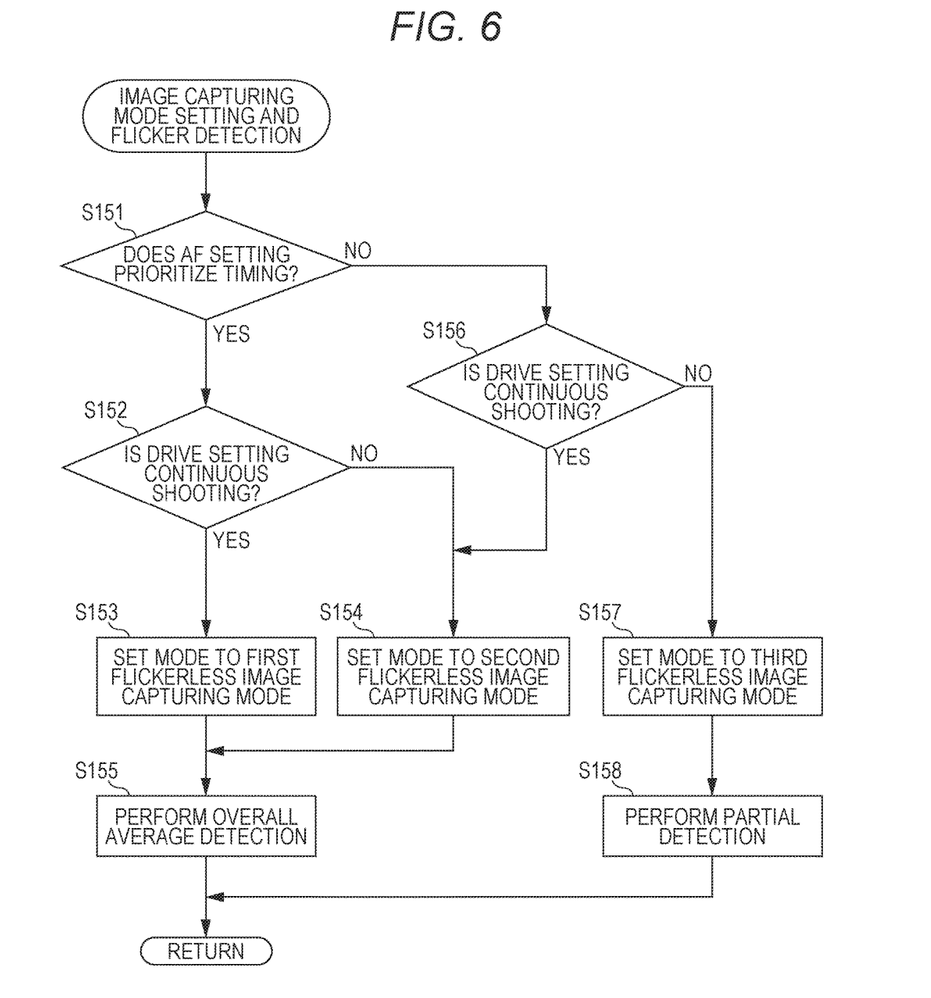
FIG. 6 is a diagram illustrating processing regarding determination and flicker detection of an image capturing mode.
Figure 7:
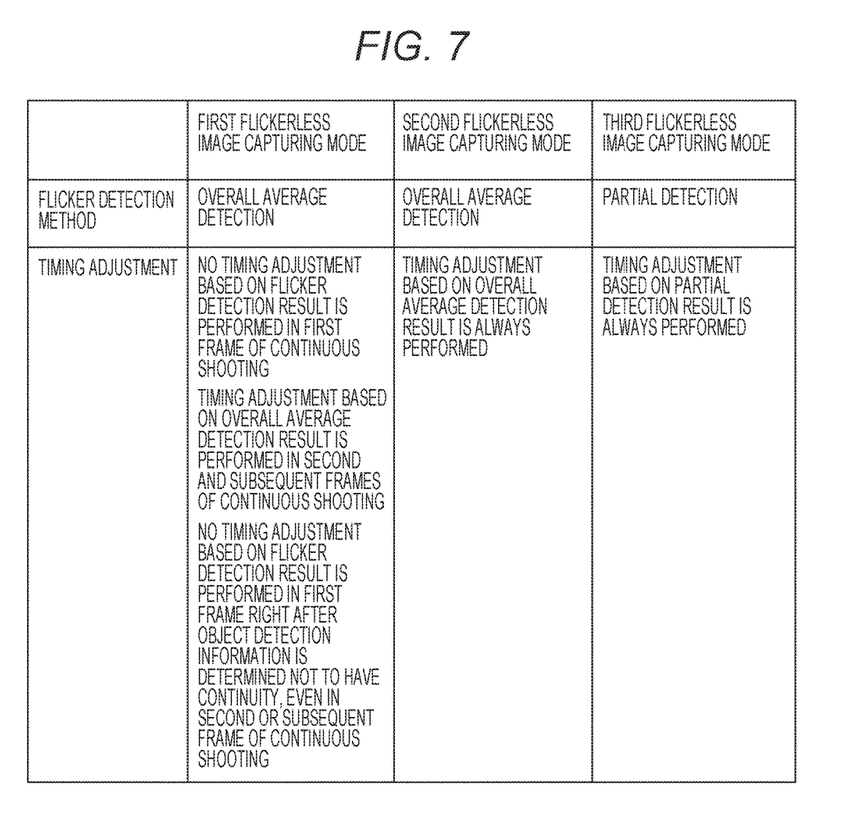
FIG. 7 is a diagram illustrating comparison among a plurality of flickerless image capturing modes of the first exemplary embodiment.
Figure 8:
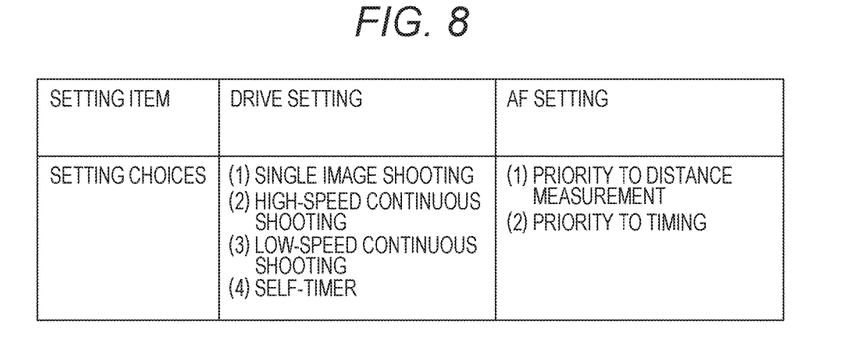
FIG. 8 is a diagram illustrating setting items settable in a camera body 1.

Next, the processing regarding the setting of the image capturing mode and the flicker detection in step S106 will be described using FIGS. 6 to 8. FIG. 6 is a diagram illustrating processing regarding determination of the image capturing mode and the flicker detection, FIG. 7 is a diagram illustrating comparison of a plurality of flickerless image capturing modes, and FIG. 8 is a diagram illustrating setting items settable in the camera body 1.

In step S151, the microcomputer 41 determines whether the selected AF setting is the timing priority, and moves onto step S152 in the case of the timing priority and moves onto step S156 in the case of not the timing priority.

In step S152, the microcomputer 41 determines whether the selected drive setting of the continuous shooting (the high-speed continuous shooting or the low-speed continuous shooting), and moves onto step S153 in the case of the continuous shooting and moves onto step S154 in the case of not the continuous shooting.

In step S153, the microcomputer 41 sets the image capturing mode to a first flickerless image capturing mode. There is a plurality of flickerless image capturing modes as illustrated in FIG. 7, and the first flickerless image capturing mode has the following characteristics.

First, in the first flickerless image capturing mode, an average photometric value of the entire photometry area (overall average detection) is used as a flicker detection method. Therefore, in the first flickerless image capturing mode, the light quantity change characteristic of a flicker light source can be accurately detected in a case where an influence of the flicker light source is large in the entire image capturing area. Meanwhile, in a case where the influence of the flicker light source is large in only a part of the image capturing area, the light quantity change characteristic of the flicker light source that irradiates the area may not be able to be detected as the photometric values are averaged.

Next, in the first flickerless image capturing mode, the exposure timing adjustment based on a detection result of the flicker detection is not performed for a first frame of the continuous shooting, and the exposure timing adjustment based on the detection result of the flicker detection is performed for a second and subsequent frames of the continuous shooting, in the exposure timing adjustment. Note that if there is no continuity in the object detection information even in the case of the second and subsequent frames of the continuous shooting, the exposure timing adjustment based on the detection result of the flicker detection is not performed. In the case of performing the exposure timing adjustment based on the detection result of the flicker detection, the exposure timing is adjusted to a predetermined phase in the light quantity change of the flicker light source in order not to cause exposure nonuniformity and color nonuniformity in the image and not to cause variation in exposure and color temperature among a plurality of continuously captured images due to the influence of the light quantity change of the flicker light source.

For example, in the neighborhood of a phase of a peak, of the light quantity change of the flicker light source, the degree of the light quantity change is smallest. Therefore, in the present exemplary embodiment, the exposure timing is adjusted to peak timing in the light quantity change of the flicker light source. As the method of adjusting the exposure timing to the peak timing in the light quantity change of the flicker light source, a known method as described in Japanese Patent Laid-Open No. 2015-210283 may just be used and detailed description is omitted. Note that the exposure timing to stand by to adjust the exposure timing to a predetermined phase in the light quantity change of the flicker light source depending on the timing when the release switch is turned ON. Meanwhile, the case of setting the first flickerless image capturing mode is a case where the drive setting is the continuous shooting and the AF setting is the timing priority. Therefore, in the first flickerless image capturing mode, the exposure timing adjustment based on the detection result of the flicker detection is not performed in the first frame of the continuous shooting, and occurrence of a release time lag is suppressed as much as possible. In the second and subsequent frames of the continuous shooting, the influence of the light quantity change of the flicker light source is suppressed while occurrence of the release time lag is suppressed, and thus the exposure timing adjustment based on the detection result of the flicker detection by the overall average detection is performed. In doing so, the flicker is less likely to be detected and the exposure timing adjustment is less likely to be performed in the case where the influence of the light quantity change of the flicker light source is partial. Therefore, occurrence of the release time lag can be suppressed. Further, the exposure timing adjustment is performed in the case where the light quantity change of the flicker light source influences the entire area, and the influence of the light quantity change of the flicker light source can be suppressed.

In step S154, the microcomputer 41 sets the image capturing mode to the second flickerless image capturing mode. The second flickerless image capturing mode is the same as the first flicker image capturing mode in that the flicker detection method is the overall average detection, but is different from the first flickerless image capturing mode in that the exposure timing adjustment based on the detection result of the flicker detection is performed every time of image capture. The case of setting the second flickerless image capturing mode is a case in which either the drive setting being the continuous shooting or the AF setting being the timing priority is satisfied. Therefore, it is favorable to suppress the influence of the light quantity change of the flicker light source while suppressing occurrence of the release time lag. Therefore, the exposure timing adjustment based on the detection result of the flicker detection is performed every time of image capture, where the overall average detection is employed as the flicker detection method, thereby to suppress the occurrence of the release time lag and the influence of the light quantity change of the flicker light source in a well-balanced manner.

In the case of setting the first flickerless image capturing mode or the second flickerless image capturing mode in steps S153 and S154, the flicker detection method is the overall average detection, and thus the microcomputer 41 moves onto step S155. Then, in step S155, the microcomputer 41 performs the flicker detection, using the average photometric value of the entire photometry area. In the overall average detection, a plurality of average photometric values based on a plurality of pieces of second photometric information is compared, and the light quantity change period of the photometric target is calculated. Further, the peak timing of the light quantity in the light quantity change of the photometric target is calculated from change tendency of the plurality of average photometric values. As the method of calculating the light quantity change period of the photometric target and the peak timing, a known method as described in Japanese Patent Laid-Open No. 2015-210283 may be just be used, and detailed description is omitted.

When the microcomputer 41 determines that the selected AF setting is not the timing priority in step S151, the microcomputer 41 determines whether the selected drive setting is the continuous shooting (the high-speed continuous shooting or the low-speed continuous shooting) in step S156. The microcomputer 41 moves onto step S154 in the case of the continuous shooting, and moves onto step S157 in the case of not the continuous shooting.

In step S157, the microcomputer 41 sets the image capturing mode to a third flickerless image capturing mode. The third flickerless image capturing mode is the same as the second flickerless image capturing mode in that the exposure timing adjustment based on the detection result of the flicker detection is performed every time of image capture. Meanwhile, the third flickerless image capturing mode is different from the second flickerless image capturing mode in that the flicker detection (partial detection) is performed in every partial area of the photometry area. The case of setting the third flickerless image capturing mode is a case in which the drive setting is not the continuous shooting and the AF setting is not the timing priority. Therefore, it is favorable to give priority to suppression of the influence of the light quantity change of the flicker light source over suppression of occurrence of the release time lag. Therefore, the exposure timing adjustment based on the detection result of the flicker detection is performed every time of image capture, and the partial detection is performed. In the case of performing the partial detection, the flicker detection is performed in every photometry area based on the respective photometric values of the 35 divided photometry areas. The method of the flicker detection is approximately the same as the flicker detection in the entire screen. In the case of performing the partial detection, it is considered that the flicker has been detected if the number of the photometry areas where the flicker is detected is equal to or more than a predetermined number. Other than the above method, a result of the flicker detection of the photometry area where change of continuous photometric values is most prominent, of the plurality of photometry areas, may be used. In the case of the partial detection, the 35 divided photometry areas may be divided into the number of groups, the number being smaller than 35, and the flicker detection may be performed in units of groups.

In step S157, in the case of setting the third flickerless image capturing mode, the flicker detection method is the partial detection, and thus the microcomputer moves onto step S158. Then, in step S158, the microcomputer 41 performs the partial detection. In the partial detection, the microcomputer 41 performs comparison of the photometric values among pieces of photometric information in the photometry areas based on the plurality of pieces of second photometric information, and calculates the light quantity change period of the photometric target, as described above. Further, the microcomputer 41 calculates the peak timing of the light quantity in the light quantity change of the photometric target from the change tendency of the photometric values of the photometry areas where the flicker is detected.

As described above, in the present exemplary embodiment, whether the exposure timing adjustment is performed and whether the flicker detection is the overall average detection or the partial detection are determined based on the flicker detection result based on the AF setting and the drive setting selected by a photographer. Therefore, the occurrence of the release time lag and the influence of the light quantity change of the flicker light source can be suppressed in accordance with an image capture intension.

Second Exemplary Embodiment

Figure 9A:
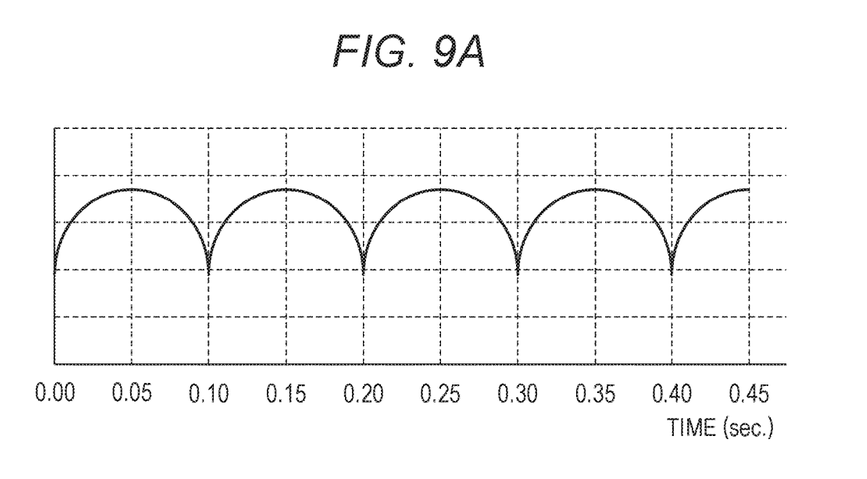
FIGS. 9A and 9B are diagrams illustrating light quantity change of a flicker light source.
Figure 9B:
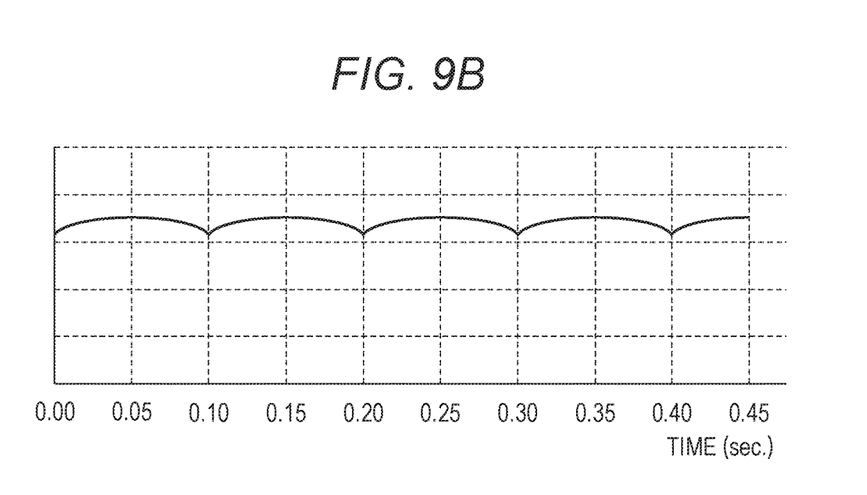
Figure 10:
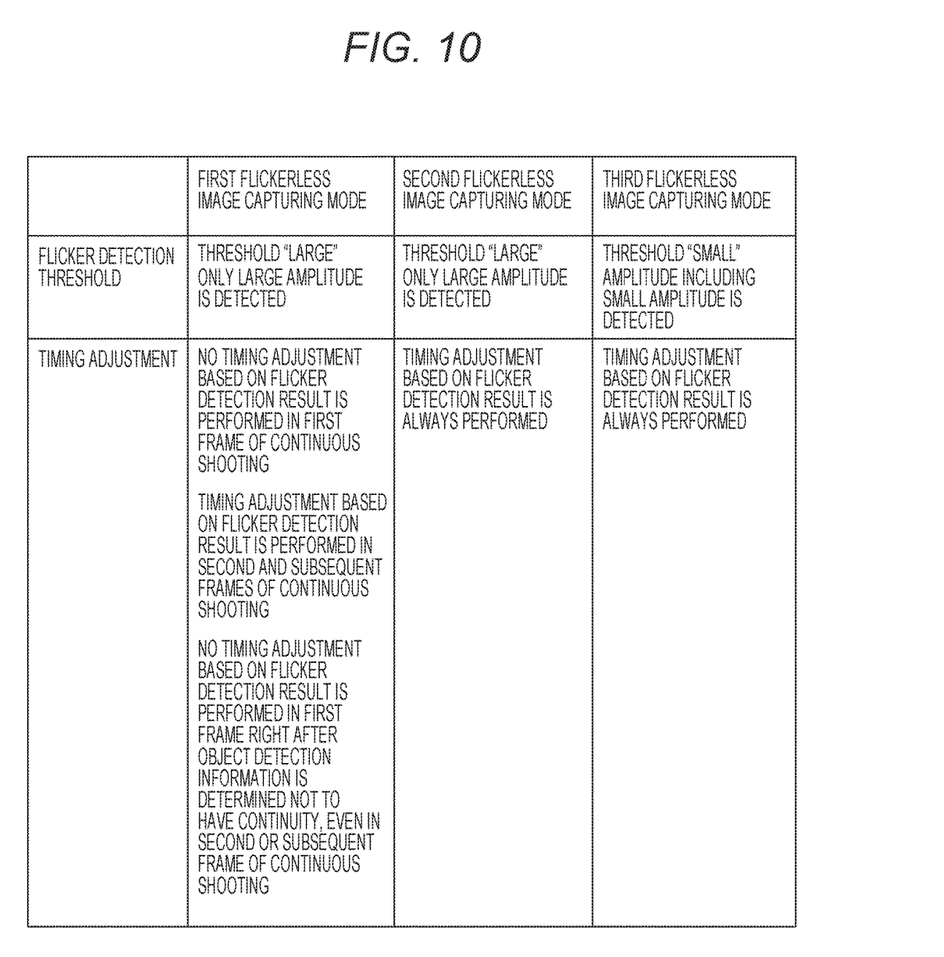
FIG. 10 is a diagram illustrating comparison among a plurality of flickerless image capturing modes.

In the first exemplary embodiment, the overall average detection and the partial detection are switched according to the type of the flickerless image capturing mode to differentiate the detection accuracy of the flicker according to the type of the flickerless image capturing mode. In the present exemplary embodiment, another example of differentiating detection accuracy of flicker according to a type of a flickerless image capturing mode will be described using FIGS. 9A, 9B, and 10. FIGS. 9A and 9B are diagrams illustrating light quantity change of a flicker light source, and FIG. 10 is a diagram illustrating comparison of a plurality of flickerless image capturing modes. The present exemplary embodiment is merely different from the first exemplary embodiment in details of the flickerless image capturing modes, and an image capturing system and operations regarding image capture in the present exemplary embodiment are similar to those of the first exemplary embodiment, and thus description is omitted.

FIGS. 9A and 9B illustrate light quantity change of a flicker light source in which a light quantity is changed in a period of 1/100 seconds corresponding to a commercial power supply of 50 Hz. The horizontal axis represents time and the vertical axis represents the light quantity. FIG. 9A illustrates the light quantity change of the flicker light source having large amplitude of the light quantity change and FIG. 9B illustrates the light quantity change of the flicker light source having small amplitude of the light quantity change.

Under the flicker light source illustrated in FIG. 9A, a photometric value of a photometry area subject to an influence of the flicker light source is substantially changed in accordance with the light quantity change of the flicker light source. That is, the photometry area subject to the influence of the flicker light source having large amplitude of the light quantity change has large amplitude of change of the photometric value. The amplitude of change of the photometric value being large means that brightness of an object corresponding to the photometry area is substantially changed according to exposure timing, and the influence of the light quantity change of the flicker light source to an image is large. Meanwhile, the photometry area subject to the influence of the flicker light source having small amplitude of the light quantity change, as illustrated in FIG. 9B, has small amplitude of change of the photometric value. Therefore, the brightness of the object corresponding to the photometry area is changed according to the exposure timing but the change is small, and thus the influence of the light quantity change of the flicker light source to the image is small.

Therefore, in the present exemplary embodiment, by changing a threshold of flicker detection (a threshold to determine existence/non-existence of the light quantity change), the detection accuracy of the flicker is differentiated according to a type of a flickerless image capturing mode.

FIG. 10 illustrates a relationship between respective flickerless image capturing modes and the thresholds of the flicker detection. To be specific, in a first flickerless image capturing mode and a second flickerless image capturing mode, the threshold of the flicker detection is made relatively larger than that in a third flickerless image capturing mode, and the flicker is detected only in the case of the large amplitude of change of the photometric value. Meanwhile, in the third flickerless image capturing mode, the threshold of the flicker detection is made relatively smaller and the flicker is detected even in the case of the small amplitude of change of the photometric value.

Note that, in the present exemplary embodiment, overall average detection and partial detection may be not used differently in the first to third flickerless image capturing modes. In a case of performing the overall average detection, existence of the light quantity change that influences an image is determined if an average photometric value exceeds the threshold and detailed flicker detection is performed. If the average photometric value is less than the threshold, non-existence of the light quantity change that influences an image is determined and detailed flicker detection is not performed. As a method of the detailed flicker detection, that is, calculation of a light quantity change period and peak timing, a method described in Japanese Patent Laid-Open No. 2015-210283 may just be used.

In a case of performing the partial detection, a microcomputer 41 performs comparison of photometric values among pieces of photometric information based on a plurality of pieces of second photometric information, and determines whether the amplitude of the photometric values exceeds the thresholds corresponding to the respective image capturing modes. Then, the detailed flicker detection is performed if the number of photometry areas where the amplitude exceeds the threshold is equal to or more than a predetermined number, and the detailed flicker detection is not performed if the number of photometry areas is less than the predetermined number.

As described above, in the present exemplary embodiment, whether the exposure timing adjustment is performed and the detection accuracy of the flicker detection are determined based on the flicker detection result based on AF setting and drive setting selected by a photographer. Therefore, occurrence of a release time lag and the influence of the light quantity change of the flicker light source can be suppressed in accordance with an image capture intension.

In the above two exemplary embodiments, the examples of selecting any of the flickerless image capturing modes have been described. However, a case of not performing the flickerless image capture on a constant basis can be considered as the image capture intension of the photographer. Therefore, whether not performing the flickerless image capture on a constant basis or whether selecting any of the flickerless image capturing modes may be able to be set by the photographer using an operation unit 49.

Further, in the above two exemplary embodiments, the examples of selecting the flickerless image capturing mode based on a combination of the drive setting and the AF setting have been described. However, the flickerless image capturing mode may be selected based on either the drive setting or the AF setting. For example, either one mode may be selected from the two modes of the first to third flickerless image capturing modes based on the drive setting or the AF setting.

Further, in the above two exemplary embodiments, the drive setting and the AF setting are exemplified as the setting items settable by the user. However, the flickerless image capturing mode may be selected based on a selection result of another setting item. For example, in a case of selecting a scene mode suitable for image capture of a moving object, the flickerless image capturing mode with a suppressed release time lag may be selected, as compared with a case of selecting a scene mode suitable for image capture of a still object. The partial detection targeting a main object area may be performed in a scene mode giving highest priority to beautifully capturing an image of a main object, like a portrait mode or a macro mode, and the overall average detection may be performed in other scene modes. Further, the partial detection may be performed in a case where the number of detected persons is one in the image capturing area, and the overall average detection may be performed in a case of a plurality of numbers of detected persons.

Further, in the above two exemplary embodiments, the exposure timing adjustment based on the detection result of the flicker detection is not performed if the object detection information does not have continuity. Here, lack of the continuity of the object detection information includes a case where the detected object disappears (the object becomes unable to be detected), a case in which a new object is detected, and a case in which the state of the detected object is changed (expression of the object is substantially changed).

Further, in the above two exemplary embodiments, the light quantity change characteristic of the photometric target is calculated based on the photometric information obtained using the photometric sensor 26. However, the light quantity change characteristic of the photometric target may be calculated based on the photometric information obtained by driving the image capturing element 12. Alternatively, the photometric information obtained by driving the image capturing element 12 may be used in the object detection processing.

The favorable exemplary embodiments of the disclosure have been described. However, the disclosure is not limited to these exemplary embodiments, and various modifications and changes are possible within the scope of the gist of the disclosure.

For example, the functions of the exemplary embodiments may be made to a control method, and this control method may be executed by an image capturing device. Alternatively, a program having the functions of the exemplary embodiments may be employed as a control program, and the control program may be executed by a computer including an image capturing device. Note that the control program is recorded in a computer-readable recording medium, for example.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-110346, filed Jun. 1, 2016 which is hereby incorporated by reference herein in its entirety.

What is claimed is:

1. An image capturing device comprising:
a photometric unit configured to obtain respective photometric values of a plurality of photometry areas in an image capturing area;
an operation unit configured to perform setting regarding continuous shooting and/or focus adjustment;
a calculation unit configured to calculate a light quantity change characteristic of a photometric target based on the photometric values of the plurality of photometry areas;
an adjustment unit configured to adjust exposure timing based on the light quantity change characteristic; and
a control unit configured to change a method of calculating the light quantity change characteristic according to the setting regarding continuous shooting and/or focus adjustment, and to determine whether the exposure timing is adjusted based on the light quantity change characteristic.

2. The image capturing device according to claim 1, wherein the control unit changes whether the light quantity change characteristic is calculated based on an average photometric value of the photometric values of the plurality of photometry areas and whether the light quantity change characteristic is calculated based on any photometric value of the plurality of photometry areas.

3. An image capturing device comprising:
a photometric unit configured to obtain respective photometric values of a plurality of photometry areas in an image capturing area;
an operation unit configured to perform setting regarding continuous shooting and/or focus adjustment;
a calculation unit configured to calculate a light quantity change characteristic of a photometric target based on the photometric values of the plurality of photometry areas;
an adjustment unit configured to adjust exposure timing based on the light quantity change characteristic; and
a control unit configured to change detection accuracy of light quantity change of when the light quantity change characteristic is calculated according to the setting regarding continuous shooting and/or focus adjustment, and to determine whether the exposure timing is adjusted based on the light quantity change characteristic.

4. The image capturing device according to claim 3, wherein the control unit changes a threshold to determine existence/non-existence of the light quantity change of when the light quantity change characteristic is calculated.

5. A method of controlling an image capturing device including a photometric unit configured to obtain respective photometric values of a plurality of photometry areas in an image capturing area and an operation unit configured to perform setting regarding continuous shooting and/or focus adjustment, the method comprising:
calculating a light quantity change characteristic of a photometric target of the photometric unit based on the photometric values of the plurality of photometry areas; and
adjusting exposure timing based on the light quantity change characteristic, wherein the calculating is to change a method of calculating the light quantity change characteristic according to the setting regarding continuous shooting and/or focus adjustment, and the adjusting is to determine whether the exposure timing is adjusted based on the light quantity change characteristic according to the setting regarding continuous shooting.

6. The method according to claim 5,
wherein the calculating changes whether the light quantity change characteristic is calculated based on an average photometric value of the photometric values of the plurality of photometry areas and whether the light quantity change characteristic is calculated based on any photometric value of the plurality of photometry areas.

7. A method of controlling an image capturing device including a photometric unit configured to obtain respective photometric values of a plurality of photometry areas in an image capturing area and an operation unit configured to perform setting regarding continuous shooting and/or focus adjustment, the method comprising:

calculating a light quantity change characteristic of a photometric target of the photometric unit based on the photometric values of the plurality of photometry areas; and adjusting exposure timing based on the light quantity change characteristic, wherein the calculating is to change detection accuracy of light quantity change of when calculating the light quantity change characteristic according to the setting regarding continuous shooting and/or focus adjustment, and the adjusting is to determine whether the exposure timing is adjusted based on the light quantity change characteristic according to the setting regarding continuous shooting set using the operation unit.

8. The method according to claim 7,
wherein the calculating changes a threshold to determine existence/non-existence of the light quantity change of when the light quantity change characteristic is calculated.

9. An image capturing device comprising:
at least one processor; and
a memory coupled to the at least one processor storing instructions that, when executed by the processor, cause the processor to function as:
a photometric unit configured to obtain respective photometric values of a plurality of photometry areas in an image capturing area;
an operation unit configured to perform setting regarding continuous shooting and/or focus adjustment;
a calculation unit configured to calculate a light quantity change characteristic of a photometric target based on the photometric values of the plurality of photometry areas;
an adjustment unit configured to adjust exposure timing based on the light quantity change characteristic; and
a control unit configured to change a method of calculating the light quantity change characteristic according to the setting regarding continuous shooting and/or focus adjustment, and to determine whether the exposure timing is adjusted based on the light quantity change characteristic.

10. The image capturing device according to claim 9,
wherein the control unit changes whether the light quantity change characteristic is calculated based on an average photometric value of the photometric values of the plurality of photometry areas and whether the light quantity change characteristic is calculated based on any photometric value of the plurality of photometry areas.

11. An image capturing device comprising:
at least one processor; and
a memory coupled to the at least one processor storing instructions that, when executed by the processor, cause the processor to function as:
a photometric unit configured to obtain respective photometric values of a plurality of photometry areas in an image capturing area;
an operation unit configured to perform setting regarding continuous shooting and/or focus adjustment;
a calculation unit configured to calculate a light quantity change characteristic of a photometric target based on the photometric values of the plurality of photometry areas;
an adjustment unit configured to adjust exposure timing based on the light quantity change characteristic; and
a control unit configured to change detection accuracy of light quantity change of when the light quantity change characteristic is calculated according to the setting regarding continuous shooting and/or focus adjustment, and to determine whether the exposure timing is adjusted based on the light quantity change characteristic.

12. The image capturing device according to claim 11,
wherein the control unit changes a threshold to determine existence/non-existence of the light quantity change of when the light quantity change characteristic is calculated.

13. A method of controlling an image capturing device including a photometric unit configured to obtain respective photometric values of a plurality of photometry areas in an image capturing area, the method comprising:

setting regarding continuous shooting and/or focus adjustment;

calculating a light quantity change characteristic of a photometric target of the photometric unit based on the photometric values of the plurality of photometry areas; and adjusting exposure timing based on the light quantity change characteristic, wherein the calculating is to change a method of calculating the light quantity change characteristic according to the setting regarding continuous shooting and/or focus adjustment, and the adjusting is to determine whether the exposure timing is adjusted based on the light quantity change characteristic according to the setting regarding continuous shooting.

14. The method according to claim 13,
wherein the calculating changes whether the light quantity change characteristic is calculated based on an average photometric value of the photometric values of the plurality of photometry areas and whether the light quantity change characteristic is calculated based on any photometric value of the plurality of photometry areas.

15. A method of controlling an image capturing device including a photometric unit configured to obtain respective photometric values of a plurality of photometry areas in an image capturing area, the method comprising:

setting regarding continuous shooting and/or focus adjustment;

calculating a light quantity change characteristic of a photometric target of the photometric unit based on the photometric values of the plurality of photometry areas; and adjusting exposure timing based on the light quantity change characteristic, wherein the calculating is to change detection accuracy of light quantity change of when calculating the light quantity change characteristic according to the setting regarding continuous shooting and/or focus adjustment, and the adjusting is to determine whether the exposure timing is adjusted based on the light quantity change characteristic according to the setting regarding continuous shooting.

16. The method according to claim 15, wherein the calculating changes a threshold to determine existence/non- existence of the light quantity change of when the light quantity change characteristic is calculated.

* * * * *